United States Patent
Brown et al.

(10) Patent No.: US 7,631,180 B2
(45) Date of Patent: Dec. 8, 2009

(54) SYSTEM AND METHOD FOR IMPLEMENTING AN ENHANCED TRANSPORT LAYER SECURITY PROTOCOL

(75) Inventors: Michael S. Brown, Waterloo (CA); Herbert A. Little, Waterloo (CA); David P. Yach, Waterloo (CA)

(73) Assignee: Research In Motion Limited, Waterloo (CA)

( * ) Notice: Subject to any disclaimer, the term of this patent is extended or adjusted under 35 U.S.C. 154(b) by 659 days.

(21) Appl. No.: 10/362,178

(22) PCT Filed: Aug. 24, 2001

(86) PCT No.: PCT/CA01/01216
§ 371 (c)(1), (2), (4) Date: Feb. 19, 2003

(87) PCT Pub. No.: WO02/17587
PCT Pub. Date: Feb. 28, 2002

(65) Prior Publication Data
US 2003/0159029 A1    Aug. 21, 2003

(51) Int. Cl.
*H04L 29/06* (2006.01)
(52) U.S. Cl. .................................................. 713/151
(58) Field of Classification Search .................. 713/151
See application file for complete search history.

(56) References Cited

U.S. PATENT DOCUMENTS
5,928,323 A * 7/1999 Gosling et al. ............... 709/203
(Continued)

FOREIGN PATENT DOCUMENTS
WO           9855930         12/1998
(Continued)

OTHER PUBLICATIONS

Jormalainen, S. and Laine, J.: "Security in the WTLS," Computer Science and Engineering, Nov. 3, 1999.
(Continued)

*Primary Examiner*—Kambiz Zand
*Assistant Examiner*—Jason K Gee
(74) *Attorney, Agent, or Firm*—Jones Day; Krishna K. Pathiyal; Robert C. Liang (57) ABSTRACT

A system and method for implementing an enhanced transport layer security (ETLS) protocol is provided. The system includes a primary server, an ETLS servlet and an ETLS software module. The primary server operates on a computer network and is configured to communicate over the computer network using a non-proprietary security protocol. The ETLS servlet also operates on the computer network and is securely coupled to the primary server. The ETLS servlet is configured to communicate over the computer network using an ETLS security protocol. The ETLS software module operates on a mobile device, and is configured to communicate over the computer network using either the non-proprietary security protocol or the ETLS security protocol Operationally, the ETLS software module initially contacts the server over the computer network using the non-proprietary security protocol, and subsequently contacts the server through the ETLS servlet using the ETLS security protocol.

26 Claims, 5 Drawing Sheets

U.S. PATENT DOCUMENTS

| | | | | |
|---|---|---|---|---|
| 6,128,738 | A * | 10/2000 | Doyle et al. | 713/185 |
| 6,665,530 | B1 * | 12/2003 | Broyles et al. | 455/411 |
| 6,665,721 | B1 * | 12/2003 | Hind et al. | 709/227 |
| 6,868,406 | B1 * | 3/2005 | Ogg et al. | 705/60 |
| 7,287,271 | B1 * | 10/2007 | Riggins | 726/3 |
| 2001/0020274 | A1 * | 9/2001 | Shambroom | 713/201 |
| 2002/0046286 | A1 * | 4/2002 | Caldwell et al. | 709/229 |
| 2002/0069273 | A1 * | 6/2002 | Bryant et al. | 709/223 |
| 2002/0129236 | A1 * | 9/2002 | Nuutinen | 713/151 |
| 2003/0038707 | A1 * | 2/2003 | Geller | 340/5.8 |
| 2003/0203732 | A1 * | 10/2003 | Eerola | 455/422.1 |

FOREIGN PATENT DOCUMENTS

| | | |
|---|---|---|
| WO | 0011832 | 3/2000 |

OTHER PUBLICATIONS

Article 96(2) EPC Communication, issued Mar. 2, 2007 by EPO, for European Application No. EP04028615.

"Handbook of Applied Cryptography", p. 397-399, XP002296840 (date unknown).

* cited by examiner

SYSTEM AND METHOD FOR IMPLEMENTING AN ENHANCED TRANSPORT LAYER SECURITY PROTOCOL

CROSS-REFERENCE TO RELATED APPLICATION

This application claims priority from and is related to the following prior application: "Enhanced Transport Layer Security Handshake For Mobile Communication Devices," U.S. Provisional Application No. 60/227,946, filed Aug. 25, 2000. This prior application, including the entire written description and drawing figures, is hereby incorporated into the present application by reference.

BACKGROUND

1. Field of the Invention

This invention relates generally to the field of computer network security protocols. More particularly, the invention provides an enhanced transport layer security ("ETLS") protocol that is especially well-suited for use with mobile communication devices, such as Personal Digital Assistants, cellular telephones, and wireless two-way e-mail communication devices (collectively referred to hereinafter as "mobile devices").

2. Description of the Related Art

Security protocols for establishing a secure connection to a computer network, such as the Internet, are known. A security protocol commonly used to securely connect to an Internet host is the Transport Layer Security ("TLS") protocol, which was formerly known as the Secure Socket Layer ("SSL") protocol.

Figure 1:
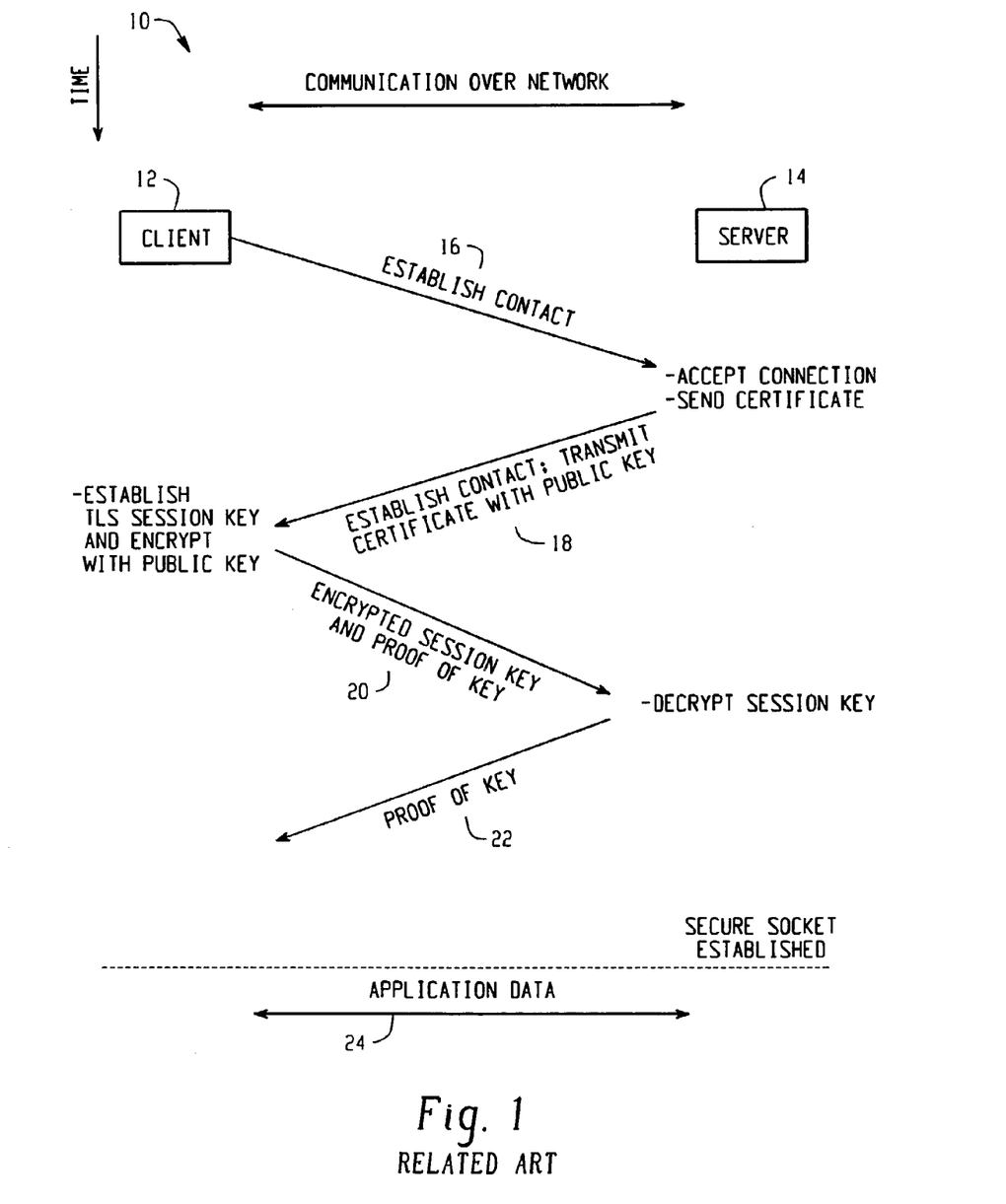
FIG. 1 is a signal flow diagram illustrating the basic steps typically used to establish a secure connection between a client and an Internet server using the TLS protocol.

FIG. 1 is a signal flow diagram 10 illustrating the basic steps typically used to establish a secure connection between a client 12 and an Internet server 14 using the TLS protocol. In step 16, an initial datagram is transmitted from the client 12 to the server 14 to establish contact and to identify the algorithms or languages that the client 12 is capable of supporting. Once the initial datagram is received, the server 14 typically accepts the connection and replies with a datagram that identifies the algorithms or languages that the server will support (step 18). In addition, the reply datagram from the server 14 typically includes a public key in a digital certificate that authenticates the identity of the server 14. The digital certificate is generally acquired from a trusted third-party, such as VeriSign™ or some other certificate authority, which verifies that the public key belongs to the server 14. In addition, the public key typically has an associated private key that is maintained only by the server 14, whereby data encrypted with the public key can only be decrypted using the private key.

In steps 20 and 22, the client 12 negotiates a session key with the server 14. The session key is typically a random number generated by the client 12 that is used for only one fetch-response operation between the client 12 and server 14. The random session key is typically first used to encrypt some random data as "proof of the key." The session key and the data are then encrypted with the public key and transmitted to the server in step 20. The session key and "proof of key" data are decrypted by the server using its private key. The "proof of key" data is then further decrypted with the session key. Then, in step 22, the server typically transmits the "proof of key" data back to the client 12 to establish that it has properly received and decrypted the session key.

Once the TLS public key has been exchanged and a session key has been negotiated, a secure TLS socket is established, and application data may be securely transmitted between the client 12 and server 14 using the session key (step 24). By utilizing this four-pass handshake between a client and a server each time a communication is initiated, the TLS protocol ensures both the authenticity of the server and the originality of the transmission. For example, to illustrate the importance of originality, if a user has communicated with a bank server via a client to electronically transfer money from an account, the four-pass TLS handshake prevents the transfer operation from being repeated by "replaying" the same encrypted message from either the same client or another client if the communication was intercepted.

Although the TLS protocol provides a secure connection to a server, this protocol is not well-suited for mobile applications because the datagrams transferred in the TLS four-pass handshake typically contain a relatively large amount of data that cannot be quickly transferred over a wireless network. Therefore, in order to reduce the number of datagrams transferred over the wireless network, mobile applications commonly utilize a Wireless Application Protocol ("WAP") to establish a secure connection with an Internet server.

Figure 2:
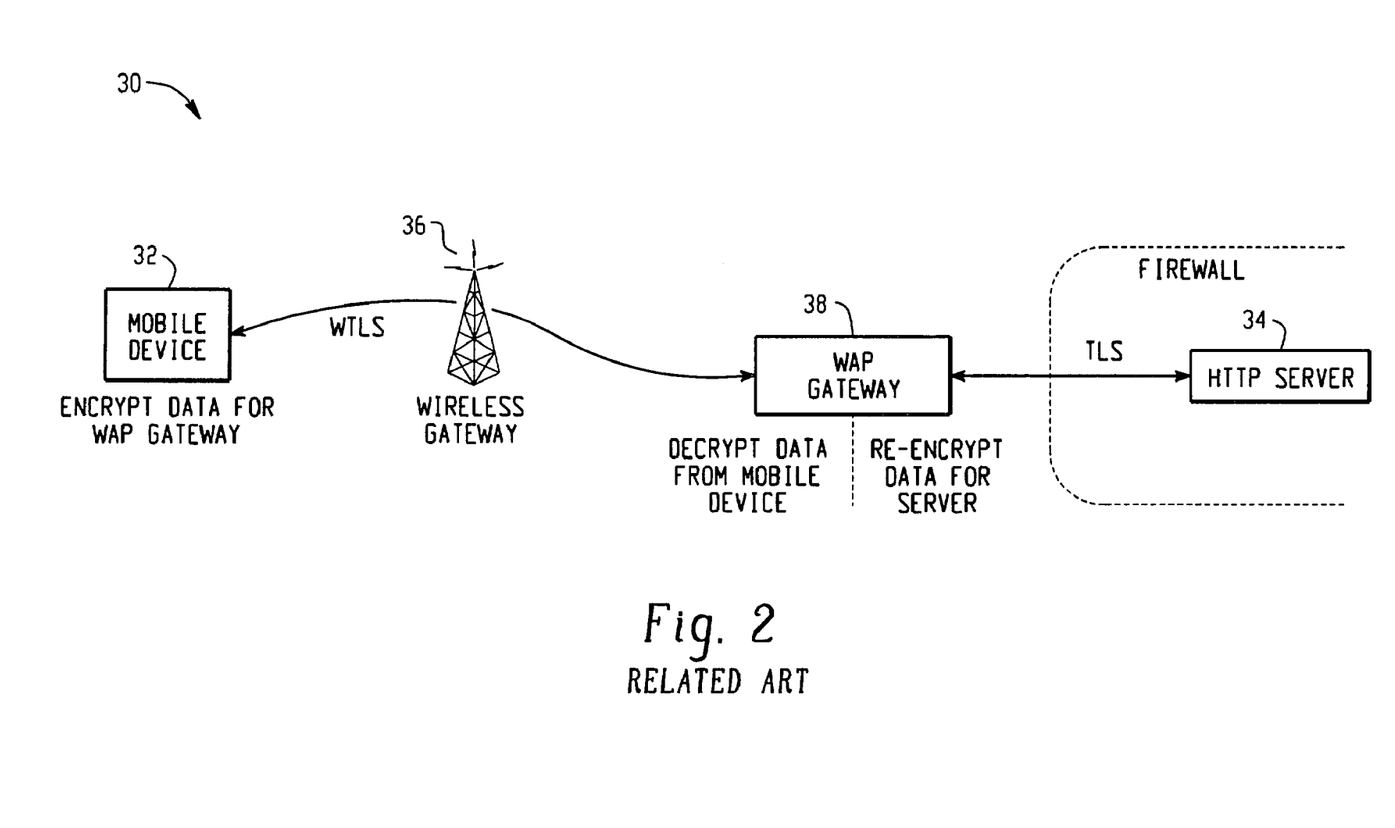
FIG. 2 is a block diagram illustrating a typical mobile communication system utilizing a Wireless Application Protocol (WAP)

FIG. 2 is a block diagram illustrating a typical mobile communication system 30 utilizing the Wireless Application Protocol (WAP). In this system 30, a service request from a mobile device 32 that is addressed to a server 34 is encoded using a Wireless Transport Layer Security (WTLS) protocol and transmitted through a wireless gateway 36 to a WAP Gateway 38, which typically acts as a proxy to the Internet. The wireless gateway and WAP gateway may or may not be co-located. Typically, the WAP Gateway 38 has its own digital certificate, signed by a trusted third-party that is used by the mobile device 32 to validate its authenticity. Once the WTLS-encrypted service request is received, the WAP Gateway 38 generally establishes a TLS connection over the Internet with the server 34. The service request is then decrypted by the WAP Gateway 38, re-encrypted using the TLS protocol and sent over the Internet to the server 34. To respond to the service request, the server 34 typically transmits TLS-encrypted data to the WAP Gateway 38, which is then decrypted and re-encrypted using the WTLS protocol and transmitted to the mobile device 32. Although this system 30 is typically faster than the TLS protocol for mobile applications, it leaves a gap in the secure link, thereby risking that data may be intercepted while it is in plaintext format in the WAP Gateway 38.

SUMMARY

A system and method for implementing an enhanced transport layer security (ETLS) protocol is provided. The system includes a primary server, an ETLS servlet and an ETLS software module. The primary server operates on a computer network and is configured to communicate over the computer network using a non-proprietary security protocol. The ETLS servlet also operates on the computer network and is securely coupled to the primary server. The ETLS servlet is configured to communicate over the computer network using an ETLS security protocol. The ETLS software module operates on a mobile device, and is configured to communicate over the computer network using either the non-proprietary security protocol or the ETLS security protocol. Operationally, the ETLS software module initially contacts the server over the computer network using the non-proprietary security protocol, and subsequently contacts the server through the ETLS servlet using the ETLS security protocol.

DETAILED DESCRIPTION

Figure 3:
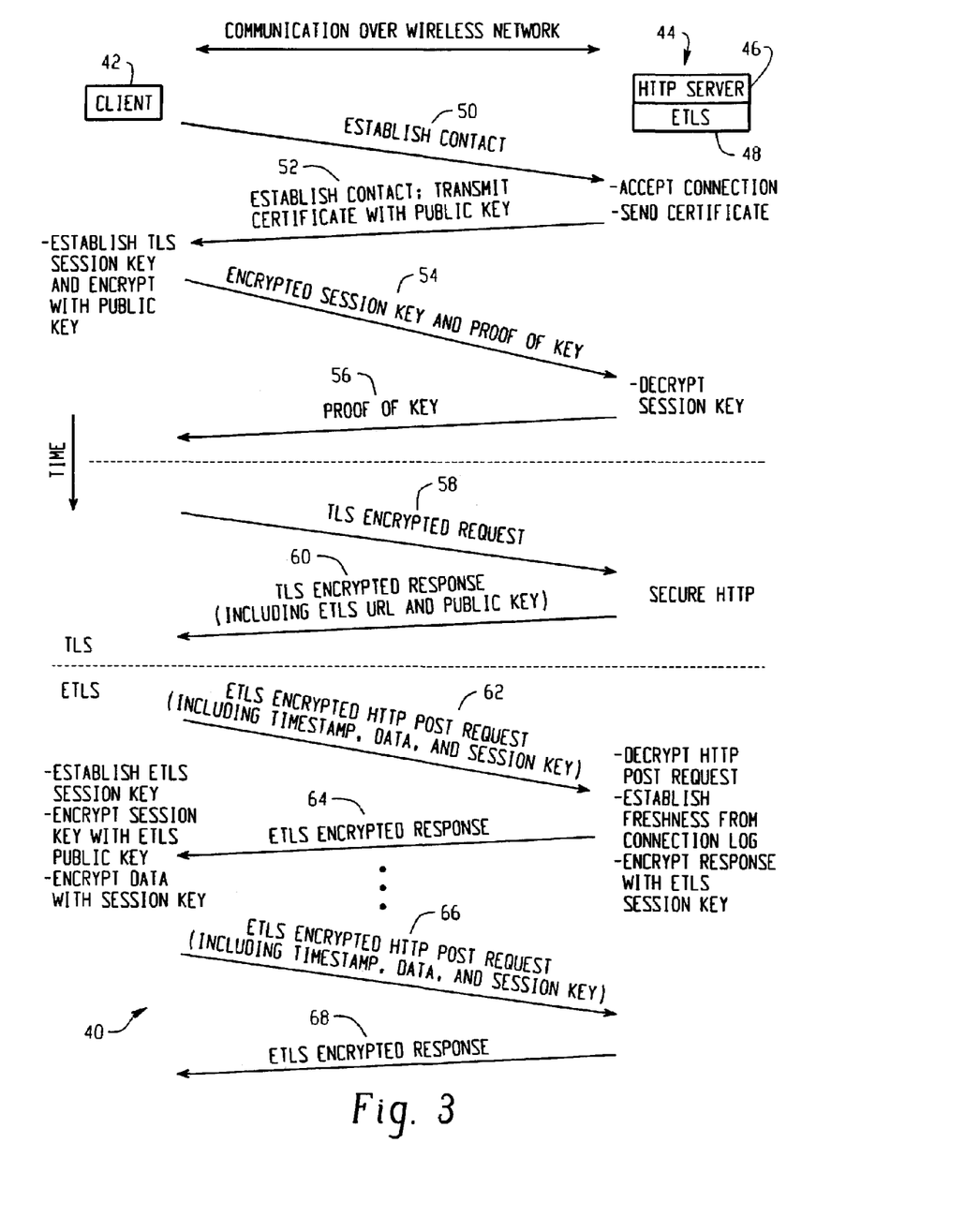
FIG. 3 is a signal flow diagram illustrating a wireless communication between a client and a server using an enhanced transport layer security ("ETLS") protocol.
Figure 4:
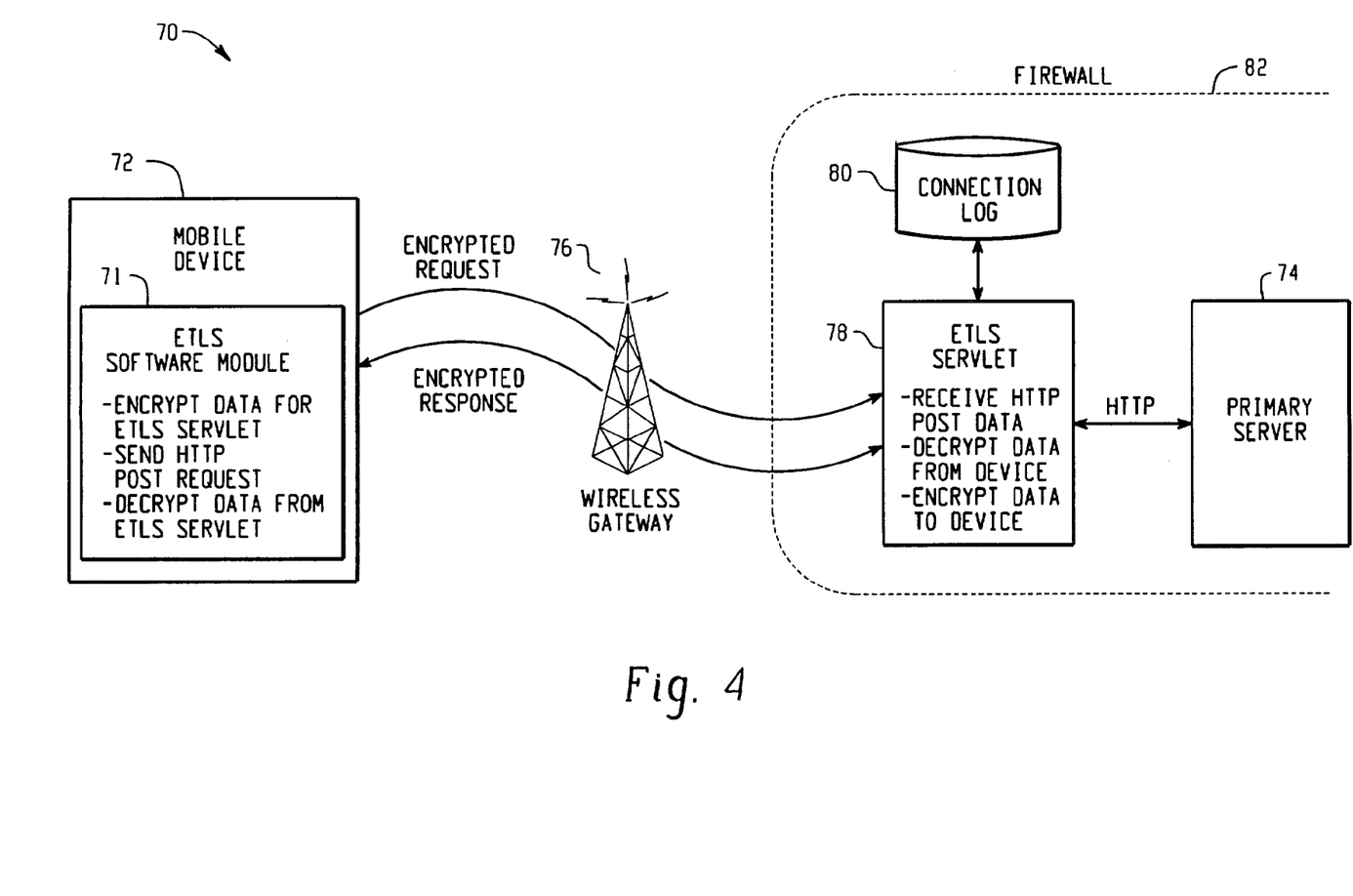
FIG. 4 is a block diagram of an exemplary ETLS system illustrating a secure connection between a mobile device and an HTTP server using the ETLS protocol.

Referring now to the remaining drawing figures, FIG. 3 is a signal flow diagram 40 illustrating a wireless communication between a client 42 and a server 44 using an enhanced transport layer security ("ETLS") protocol. The client 42 may be any system operating on a mobile device that is capable of wirelessly accessing a computer network. The server 44 preferably includes a primary server, such as an HTTP server 46, and an ETLS servlet 48, both operating on a computer network, such as the Internet. The ETLS servlet 48, discussed in more detail below with reference to FIG. 4, is preferably a JAVA™ servlet operating on the HTTP server 46, but could alternatively be some other server-side mechanism such as a CGI script. The ETLS servlet 48 is preferably installed on the HTTP server 46 with its own uniform resource locator (URL), which is added to a custom HTTP response header along with an ETLS public key.

In step 50, the client 42 attempts to open a secure connection with the server 44. At this point, the client 42 has not yet detected the ETLS servlet 48, and, therefore, uses a non-proprietary security protocol such as the TLS protocol. The TLS four-pass handshake, discussed above with reference to FIG. 1, is performed in steps 50-56. In steps 50 and 52, the client 42 and the server 44 determine which operations or languages they have in common, and a TLS public key in a digital certificate is transferred to the client 42. In steps 54 and 56, a random TLS session key is negotiated. Then, in step 58 the initial service request from the client 42 is encrypted with the TLS session key and transmitted to the HTTP server 46. The HTTP server 46 decrypts the service request and transmits its initial encrypted response in step 60. Along with the encrypted data, the initial response 60 from the HTTP server 46 also includes the custom HTTP response header with the URL of the ETLS servlet 48 and the ETLS public key. The ETLS public key is preferably generated by the ETLS servlet 48, and has an associated ETLS private key that is maintained exclusively by the ETLS servlet 48. The client 42 preferably stores the ETLS public key and associated URL in a memory location on the mobile device. Thereafter, each time the client 42 establishes a secure connection to the server 44, it uses the ETLS public key and associated URL to communicate through the ETLS servlet 48.

Steps 62-68 illustrate two secure ETLS transmissions between the client 42 and the server 44 after the ETLS public key and associated URL have been received and stored by the client 42. To establish a secure connection using the ETLS protocol, the client 42 first establishes a random ETLS session key and encrypts it with the ETLS public key received from the custom HTTP response header. The client 42 then uses the ETLS session key to encrypt the bulk data that makes up its service request to the server 44 and also to encrypt a digital time-stamp. In step 62, the client 42 transmits the data to the ETLS servlet, preferably in the form of an HTTP POST request that includes the encrypted session key, service request and time-stamp. Once the ETLS servlet 48 has received the HTTP POST request, the request is decrypted and compared to a connection log to establish that the transmission is original. At this point, the security of the communication has been established, and the ETLS servlet 48 may perform a fetch-response operation with the HTTP server 46. Then, once a response from the HTTP server 46 has been returned, the ETLS servlet 48 encrypts the response with the ETLS session key and transmits it to the client 42 in step 64. The ETLS protocol, including the operations of the digital time-stamp and the connection log, are discussed in more detail below with reference to FIG. 4.

Steps 66 and 68 illustrate that each subsequent communication between the client 42 and the server 44 may be performed using the same two-step ETLS handshake described above with reference to steps 62 and 64. In this manner, the ETLS protocol enables secure communications between a mobile device and an Internet server without requiring the lengthy, multiple transmissions commonly associated with non-proprietary security protocols, such as the TLS protocol.

FIG. 4 is a block diagram of an exemplary ETLS system 70 illustrating a secure connection between a mobile device 72 and an primary server 74 using the ETLS protocol. Cross-referencing FIGS. 3 and 4, the ETLS system 70 shown in FIG. 4 illustrates the ETLS connections made in steps 62-68 of FIG. 3, and after the initial TLS connection shown in steps 50-60 of FIG. 3. The ETLS system 70 includes the mobile device 72, the primary server 74, a wireless gateway 76, the ETLS servlet 78 and the connection log 80. The primary server 74, ETLS servlet 78 and connection log 80 are located on a computer network, such as the Internet, and are preferably protected behind a common firewall 82. Communications between the mobile device 72 and the computer network are preferably made through the wireless gateway 76 using any known Web browser-type software designed for use on a mobile device. The mobile device 72 preferably also includes an ETLS software module 71 that is configured to establish a secure connection with the computer network using either the ETLS protocol or a non-proprietary security protocol such as the TLS protocol.

To send a service request to the primary server 74 using the ETLS protocol, the mobile device 72 preferably establishes a random ETLS session key that it uses to encrypt the service request, and encrypts the session key using the stored ETLS public key for the ETLS Servlet 78. In addition, to protect against "replay" communications, an electronic time-stamp is also preferably generated by the mobile device and encrypted using the ETLS session key. Then, the encrypted service request, session key and time-stamp are all bundled in an HTTP POST request, or some other suitable transfer mechanism, and transmitted through the wireless gateway 76 to the ETLS servlet 78.

When the HTTP POST request is received at the ETLS servlet 78, the ETLS session key is preferably decrypted with the ETLS private key that is maintained by the ETLS servlet 78. The ETLS session key is then used by the ETLS servlet 78 to decrypt the service request and time-stamp. Preferably, a digital certificate from the primary server 74 was received and stored by the mobile device 72 when it first contacted the primary server 74 using a non-proprietary security protocol. Therefore, the identity of the primary server 74 has already been verified. The link is not yet secure, however, because a multi-pass handshake, such as the TLS handshake, was not used to negotiate the ETLS session key and establish that the transmission is original. The ETLS servlet 78 thus preferably protects against "replay" communications by comparing the decrypted service request and time-stamp with previous transmissions stored in the connection log 80. In this manner, if the ETLS servlet 78 receives an encrypted HTTP POST request that includes a service request and time-stamp that is identical to that of a previous transmission stored in the communication log, then the servlet 78 will recognize that the service request is not an original communication, and will preferably ignore the service request. In a preferred embodiment, the communication log stores all of the service requests and time-stamps received by the ETLS servlet 78 within a pre-determined time period. Alternatively, the ETLS servlet 78 may save only the time-stamps or some other data, such as an ordinal number, indicating the originality of the transmission.

Once the HTTP POST request has been decrypted by the ETLS servlet 78 and compared with the previous transmissions stored in the connection log 80, a secure link between the mobile device and the ETLS servlet 78 has been established. The decrypted service request may then be transmitted from the ETLS servlet 78 to the primary server 74, which performs the desired operation and returns a response to the ETLS servlet 78. Because the ETLS servlet 78 and the primary server 74 operate behind the common firewall 82, the non-encrypted data may be securely transferred using a standard transfer protocol, such as HTTP. Once the response from the primary server 74 is received by the ETLS servlet 78, it is encrypted with the ETLS session key and transmitted through the wireless gateway 76 to the mobile device 72. At the mobile device 72, the response is decrypted with the session key. Then, if a new service request is desired, a new session key may be generated by the mobile device 72, and the above described process repeated.

Figure 5:
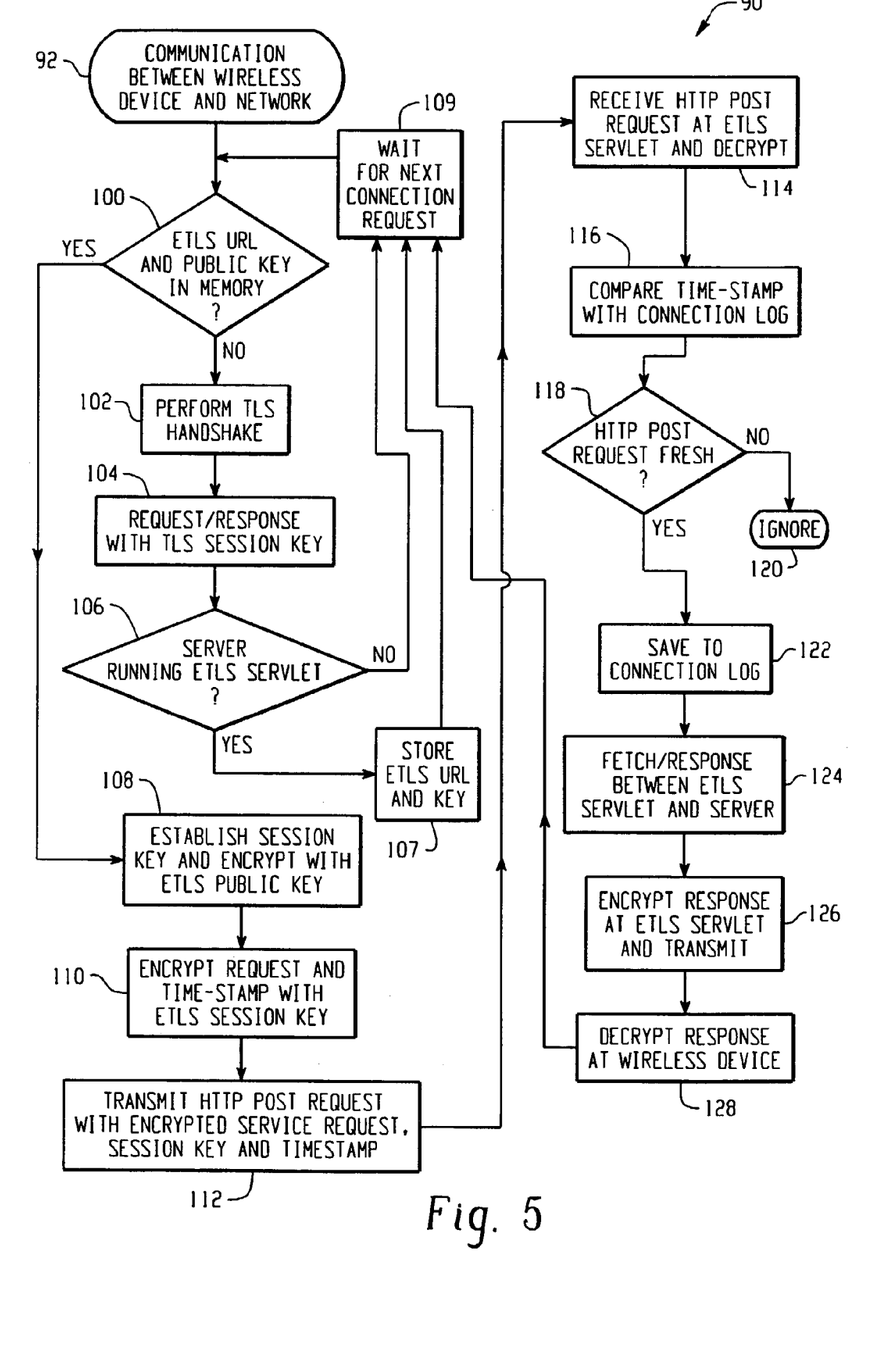
FIG. 5 is a flow diagram of an exemplary method for securely communicating between a mobile device and a network server using the ETLS protocol.

FIG. 5 is a flow diagram of an exemplary method for securely communicating between a mobile device and a network server using the ETLS protocol. The method begins at step 92 in which communication is established between a mobile device and a network server operating on a computer network, such as the Internet. Once communication with the computer network has been established, the mobile device preferably accesses an internal memory location at step 100 to determine if an ETLS public key and an ETLS servlet URL have previously been saved for the particular network server. If so, then the mobile device recognizes that a secure link may be established using an ETLS servlet operating in connection with the server, and an ETLS handshake is performed starting at step 108. If the mobile device does not have a stored ETLS URL and public key for the server, however, then a secure socket should preferably be opened with the server using a non-proprietary security protocol, such as the TLS protocol (step 102). After a secure socket has been negotiated with the server, the mobile device may then send an encrypted service request to which the server may respond with an encrypted TLS response (step 104). If the server is equipped with an ETLS servlet (step 106), then the TLS response sent by the server in step 104 will preferably include a custom HTTP response header that identifies the ETLS public key and the associated URL for the ETLS servlet, which is stored on the device in step 107. The device then waits for a request for the next connection at step 109. If the server is not equipped with an ETLS servlet (step 106), however, the device preferably waits until the device requests the next connection at step 109.

At step 108, the mobile device preferably begins the ETLS handshake by generating a session key and encrypting it with the ETLS public key previously received from the server in the custom HTTP response header. At step 110, the service request from the mobile device and a digital time-stamp are both encrypted using the session key (step 110). The digital time-stamp preferably includes the time and date that the transmission takes place. Then, at step 112, the encrypted service request, time-stamp and session key are transmitted to the ETLS servlet, preferably in the form of an HTTP POST request or some other suitable transfer mechanism.

When the HTTP POST request is received by the ETLS servlet, the ETLS session key is decrypted using a private key maintained exclusively by the ETLS servlet, and the decrypted session key is then used to decrypt the service request and digital time-stamp (step 114). At step 116, the digital time-stamp is compared with those of previous transmissions stored in a connection log that is maintained by the ETLS servlet. If the time-stamp matches that of a previous transmission stored in the connection log, then the transmission is not original (step 118), and the service request is preferably ignored by the ETLS servlet (step 120). If the transmission is original (step 118), however, then the digital time-stamp is saved to the connection log (step 122) to prevent the transmission from being "replayed" in subsequent communications. In alternative embodiments, both the time-stamp and service request may be stored in the connection log and compared with the HTTP POST request, or the time-stamp may be replaced with some other means for determining that the request is original, such as an ordinal number.

In step 124, a secure link has been established and a fetch-response operation is performed between the ETLS servlet and the server to perform the function indicated in the service request from the mobile device. Then, in step 126 the response from the server is encrypted by the ETLS servlet using the session key and is transmitted to the mobile device. The response is decrypted by the mobile device at step 128, and a new service request may then be initiated by the mobile device at step 109.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences form the literal language of the claims.

We claim:
1. A method of securely communicating service requests from a mobile device to a server via a computer network, comprising:
   positioning a security servlet between the computer network and the server in order to protect the server from replay requests transmitted over the computer network, the servlet having an electronic address on the computer network;
   maintaining a connection log that stores one or more service requests received by the security servlet from the computer network;

transmitting an encrypted service request from the mobile device to the security servlet using the electronic address of the servlet, the encrypted service request including information requesting a service from the server and specifying what content is to be retrieved and returned to the mobile device, the encrypted service request further including a timestamp;

decrypting the encrypted service request at the security servlet to generate a decrypted service request;

preventing replay requests from being transferred to the server by comparing the decrypted service request, which specifies what content is to be retrieved and returned to the mobile device, with one or more service requests stored in the connection log to determine if the decrypted service request is original or replayed, wherein the comparing includes determining if the timestamp is a match with a timestamp stored in the connection log; and if the decrypted service request is original, then transferring the decrypted service request from the security servlet to the server, wherein the service request only reaches the server if it is determined to be an original service request by the security servlet.

2. The method of claim 1, wherein the encrypted service request is transmitted to the servlet from the mobile device through a wireless gateway coupled to the computer network.

3. The method of claim 1, wherein the servlet and the server are installed on distinct computers.

4. The method of claim 1, wherein the servlet and the server are protected from the computer network by a firewall.

5. The method of claim 1, wherein the servlet comprises a JAVA servlet.

6. The method of claim 1, wherein the servlet comprises a CGI script.

7. The method of claim 1, wherein the server comprises an HTTP server and the service requests comprise HTTP service requests for web pages stored at the HTTP server.

8. The method of claim 1, further comprising:
storing the decrypted service request in the connection log.

9. The method of claim 1, further comprising:
storing a time-stamp along with each of the one or more service requests in the connection log;
associating a current time-stamp with the decrypted service request; and
comparing the current time-stamp with each of the time-stamps stored in the connection log to determine if the decrypted service request is original or replayed.

10. The method of claim 9, further comprising:
comparing the decrypted service request with each of the service requests stored in the connection log to determine if the decrypted service request is original or replayed.

11. The method of claim 1, wherein the electronic address comprises a uniform resource locator (URL).

12. The method of claim 1, further comprising:
maintaining a private key at the security servlet;
receiving a public key associated with the security servlet at the mobile device; and
encrypting the service request at the mobile device using the public key associated with the security servlet.

13. The method of claim 12, further comprising:
decrypting the encrypted service request at the security servlet using the private key.

14. The method of claim 1, further comprising:
maintaining a private key at the security servlet;
receiving a public key associated with the security servlet at the mobile device;

generating a session key at the mobile device and encrypting the service request at the mobile device using the session key;

encrypting the session key with the public key;

transmitting the encrypted session key and the encrypted service request from the mobile device to the security servlet; and recovering the session key from the encrypted session key at the security servlet and using the session key to decrypt the encrypted service request.

15. The method of claim 14, wherein the session key comprises a random number.

16. The method of claim 14, wherein the public key is received from the server in the form of a custom HTTP response header.

17. The method of claim 1, wherein the encrypted service request is transmitted to the servlet in the form of an HTTP POST request.

18. The method of claim 1, further comprising:
generating a response to the decrypted service request at the server;
transferring the response from the server to the security servlet;
encrypting the response at the servlet; and
transmitting the encrypted response from the servlet to the mobile device via the computer network.

19. The method of claim 1, wherein information contained in the encrypted service request is generated by the mobile device without requiring a prior communication from the server in order to generate the information contained in the encrypted service request.

20. A secure server system, comprising:
a primary server operating on a computer network, the primary server responding to service requests transmitted over the computer network by user computer systems, wherein the service requests include a timestamp;

a security servlet positioned between the computer network and the primary server in order to protect the primary server from replay requests transmitted over the computer network, the security servlet having an electronic address on the computer network for receiving encrypted service requests and for decrypting the encrypted service requests; and wherein the encrypted service requests specify what content is to be retrieved and returned to the user computer systems;

a connection log that stores one or more service requests received by the security servlet from the computer network;

wherein the security servlet prevents replay requests received by the security servlet from being transferred to the primary sever by comparing the decrypted service requests, which specify what content is to be retrieved and returned to the user computer systems, with the one or more service requests stored in the connection log to determine if the decrypted service requests are original or replayed, and if original, then transferring the decrypted service requests from the security servlet to the primary server, wherein the comparing includes determining if the timestamp is a match with a timestamp stored in the connection log.

21. The system of claim 20, further comprising:
a firewall positioned between the computer network and the primary server and the security servlet.

22. The system of claim 20, wherein the security servlet is coupled to the primary server via an HTTP connection.

23. The system of claim 20, wherein the security servlet comprises a JAVA servlet.

24. The system of claim 20, wherein the primary server comprises an HTTP server.

25. The system of claim 20, wherein the decrypted service request includes a current time-stamp and wherein the connection log stores a prior time-stamp associated with the stored service requests, the security servlet determining the originality of the decrypted service requests by comparing the current time-stamp with the prior time-stamps stored in the connection log.

26. The system of claim 20, wherein the decrypted service request is assigned a current ordinal number and wherein the connection log stores prior ordinal numbers associated with the stored service requests, the security servlet determining the originality of the decrypted service requests by comparing the current ordinal number with the prior ordinal numbers stored in the connection log.

* * * * *

UNITED STATES PATENT AND TRADEMARK OFFICE
CERTIFICATE OF CORRECTION

| | | |
|---|---|---|
| PATENT NO. | : 7,631,180 B2 | Page 1 of 1 |
| APPLICATION NO. | : 10/362178 | |
| DATED | : December 8, 2009 | |
| INVENTOR(S) | : Brown et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Second Day of November, 2010

David J. Kappos
*Director of the United States Patent and Trademark Office*